United States Patent
Gonsalves (10) Patent No.: US 6,766,063 B2
(45) Date of Patent: Jul. 20, 2004

(54) GENERATION ADAPTIVE FILTERING FOR SUBSAMPLING COMPONENT VIDEO AS INPUT TO A NONLINEAR EDITING SYSTEM

(75) Inventor: Robert A. Gonsalves, Wellesley, MA (US)

(73) Assignee: Avid Technology, Inc., Tewksbury, MA (US)

( * ) Notice: Subject to any disclaimer, the term of this patent is extended or adjusted under 35 U.S.C. 154(b) by 651 days.

(21) Appl. No.: 09/775,921

(22) Filed: Feb. 2, 2001

(65) Prior Publication Data

US 2002/0105526 A1 Aug. 8, 2002

(51) Int. Cl.[7] .............................................. G06K 5/00
(52) U.S. Cl. ...................... 382/261; 382/275; 382/300
(58) Field of Search ................................. 382/261, 263, 382/264, 298–300, 275; 348/390.1, 558, 391.1, 576, 395.1, 604, 399.1, 712, 713

(56) References Cited

U.S. PATENT DOCUMENTS 6,453,074 B1 * 9/2002 Zheng .......................... 382/260
6,496,186 B1 * 12/2002 Deering ....................... 345/419

OTHER PUBLICATIONS

Moghaddamzadeh, Ali et al., "An Object–Based Approach to Color Subsampling", 1996 IEEE, No. 0–7803–3192–3/96, pp. 1894–1897.
Murching, Anil M., et al., "Adaptive Color Subsampling Of Images", Proc.SPIE Conf. Visual Communications and Image Proc., vol. 2094, Part 3, pp. 1198–1206, Nov. 1993.
Murching, Anil M., et al., "Adaptive Subsampling of Color Images", Proceedings ICIP 1994, vol. 3.
Turkowski, Ken, "Filters for Common Resampling Tasks", Apr. 10, 1990.

* cited by examiner

*Primary Examiner*—Brian Werner
*Assistant Examiner*—Patrick Edwards
(74) *Attorney, Agent, or Firm*—Peter J. Gordon (57) ABSTRACT

If graphics data is imported into and then exported from a nonlinear editing system several times, image quality tends to degrade due to multiple filtering operations applied to the graphics data on import. Sometimes, a portion of graphics data imported into a nonlinear editing system has been processed by a nonlinear editing system, whereas another portion has not. To avoid such degradation of image quality, portions of graphics data that have been previously filtered and decimated are identified and not filtered prior to decimation. Other portions of graphics data are filtered and decimated.

28 Claims, 5 Drawing Sheets

GENERATION ADAPTIVE FILTERING FOR SUBSAMPLING COMPONENT VIDEO AS INPUT TO A NONLINEAR EDITING SYSTEM

BACKGROUND

Nonlinear editing systems commonly process video that is stored in a subsampled component video format. There are a number of subsampled component video formats, such as YCrCb 4:2:2 video data. Data in this format may be received as RGB component video data that is converted into YCrCb data in a 4:4:4 format, which is then decimated to the subsampled 4:2:2 format.

Graphics data that is imported into a nonlinear editing system commonly is in an RGB component video data format. To avoid various visible artifacts in an image, due particularly to aliasing, graphics data commonly is filtered prior to decimation.

Graphics data also is commonly exported from a nonlinear editing system from the subsampled YCrCb 4:2:2 format into the RGB component video data format. This export process involves interpolating or filtering the decimated data to produce the RGB component video data.

SUMMARY

If graphics data is imported into and then exported from a nonlinear editing system several times, image quality tends to degrade due to multiple filtering operations applied to the graphics data on import. Sometimes, a portion of graphics data imported into a nonlinear editing system has been processed by a nonlinear editing system, whereas another portion has not. To avoid such degradation of image quality, portions of graphics data that have been previously filtered and decimated are identified and not filtered prior to decimation. Other portions of graphics data are filtered and decimated.

Accordingly, in one aspect, an image in a first color representation is imported into digital nonlinear video editing system that uses images in a second subsampled color representation by detecting in a portion of the image in the first color representation a signature of an upsampling filter for generating an image in the first color representation from an image in the second subsampled color representation. If the signature is detected, the portion of the image in the first color representation is decimated without filtering the portion of the image. If the signature is not detected, the portion of the image in the first color representation is filtered before decimating the portion of the image.

In another aspect, an image in a first color representation is imported into digital nonlinear video editing system that uses images in a second subsampled color representation by determining for each pixel in an image in the second color representation, whether a corresponding portion of the image in the first color representation was filtered using an upsampling filter for generating an image in the first color representation from an image in the second subsampled color representation. If the portion of the image in the first color representation was filtered using the upsampling filter, the portion of the image is decimated without filtering the portion of the image. If the portion of the image in the first color representation was not filtered using the upsampling filter, the portion of the image is filtered before decimating the portion of the image.

Another aspect is a method or system for determining a measure of likelihood that an image in a first color representation was filtered using an upsampling filter used by a digital nonlinear video editing system to generate an image in the first color representation from an image in a second subsampled color representation. A set of pixels in the image in the first color representation is selected according to the second subsampled color representation. A value for each of a plurality of pixels intermediate the selected pixels is estimated. The estimated value is compared to an actual value for the plurality of pixels intermediate the selected pixels in the image in the first color representation.

Another aspect is a method or system for generation adaptive filtering an image in a first color representation during conversion of the image to a second subsampled color representation used in a digital nonlinear video editing system. Information is received that is indicative of, for each of a plurality of selected pixels in the image in the first color representation, whether the portion of the image around the selected pixel was filtered using an upsampling filter used by the digital nonlinear video editing system to generate an image in the first color representation from an image in the second subsampled color representation. Each of the selected pixels of the image in the first color representation is selectively filtered and decimated according to whether the portion of the image around the pixel was filtered using the upsampling filter.

Another aspect is a digital information product that includes a computer readable medium and information stored on the computer readable medium that, when interpreted by a computer, indicates, for each of a plurality of selected pixels in an image in a first color representation, whether that the portion of the image around the selected pixel was filtered using an upsampling filter used by a digital nonlinear video editing system to generate an image in the first color representation from an image in a second subsampled color representation.

In the various foregoing aspects, detection may be performed by determining a measure of likelihood that an image in a first color representation was filtered using an upsampling filter used by a digital nonlinear video editing system to generate an image in the first color representation from an image in a second subsampled color representation. The measure of likelihood may be determined by selecting a set of pixels in the image in the first color representation according to the second subsampled color representation, estimating a value for each of a plurality of pixels intermediate the selected pixels, and comparing the estimated value to an actual value for the plurality of pixels intermediate the selected pixels in the image in the first color representation. Such comparison may be performed by determining whether the estimated value is within a range defined around the actual value. In the various foregoing aspects, filtering may be performed by applying a tent filter to pixel data comprising the portion of the image.

DETAILED DESCRIPTION

A nonlinear editing system allows sequences of segments of video, audio and other data stored on a random access computer readable medium to be combined into a temporal presentation.

A nonlinear editing system generally has a color representation in which video data is formatted for processing. The color representation may be red, green and blue components, or luminance and chroma components, for each pixel in the video data. Each component value generally is represented by a number of bits, such as 8 bits or 10 bits.

A nonlinear editing system commonly processes video that is stored in a subsampled component video format. A component video format is subsampled if one or more of the components is sampled at a frequency lower than the frequency at which the other component is sampled. For example, the luminance component may be sampled for each pixel, whereas the chrominance components may be sampled every other pixel. An example of such a format is called YCrCb 4:2:2 video data. Other kinds of subsampled component video formats include, but are not limited to, 4:1:1, 4:2:0, YUV9 and 4:1:0. In some formats, the subsampling performed is adaptive.

A nonlinear editing system commonly receives data in another format, such as RGB video data that is not subsampled. This other video data is converted by the nonlinear editing system into YCrCb data in a 4:4:4 format, which is then decimated to the subsampled 4:2:2 format for processing. If exported from the system into RGB format, the subsampled data is upsampled. Upsampling commonly is performed by using simple linear interpolation, but any other kind of interpolation filter may be used.

If the incoming data has been previously subsampled and upsampled, it is sometimes possible to identify in the upsampled data where the upsampling occurred, with some level of certainty. In other words, the upsampling process leaves a sort of signature in the image data that can be detected. A measure of likelihood that an image or portion of an image was previously upsampled can be determined. To avoid degradation of image quality, portions of graphics data that have been previously filtered and decimated are identified and not filtered prior to decimation. Such degradation often occurs with graphics that have high frequencies in the chroma components. Other portions of graphics data are filtered and decimated. This process is referred to herein as generation adaptive filtering.

Figure 1:
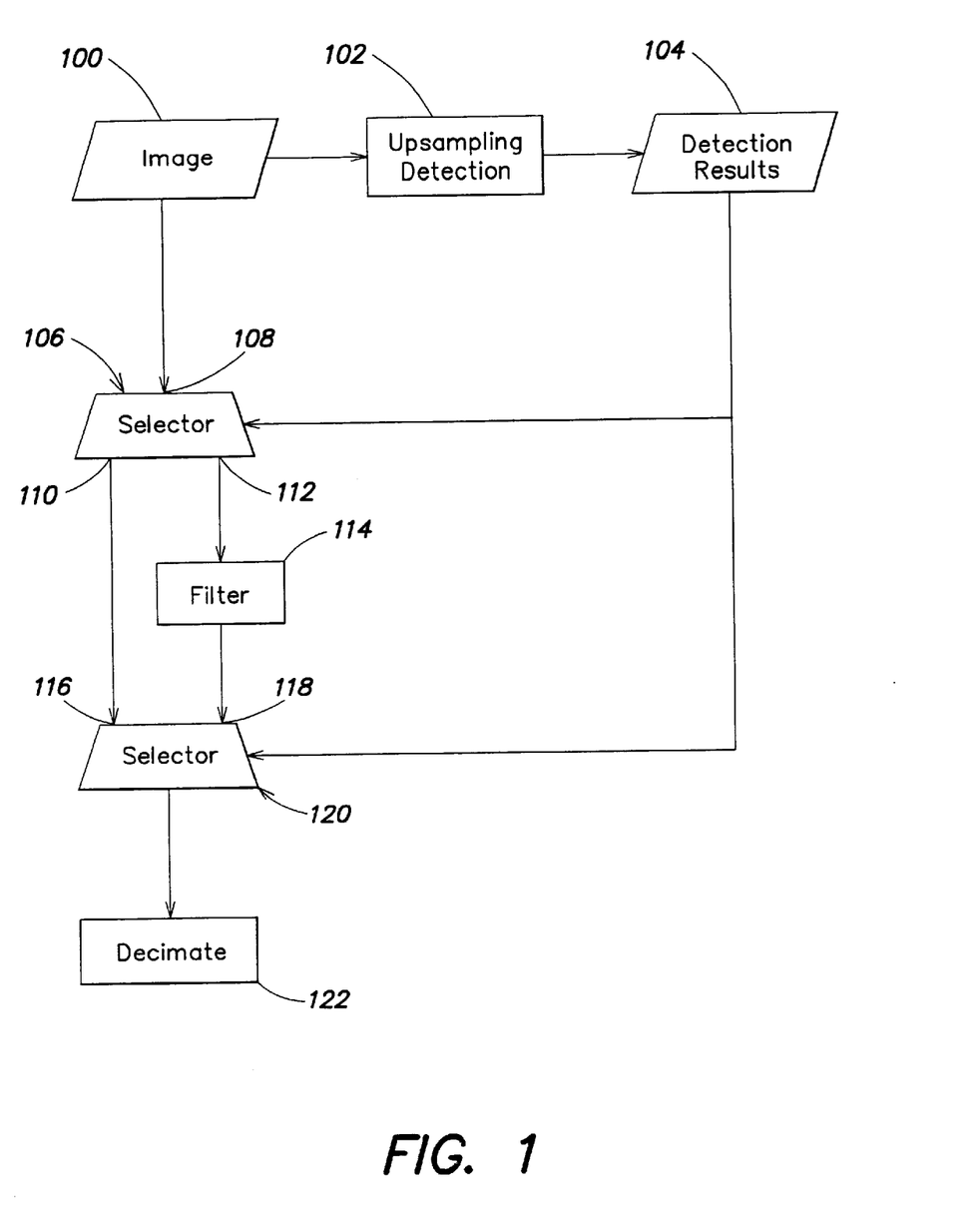
FIG. 1 is a block diagram of an example generation adaptive filter.

FIG. 1 is a block diagram of an example generation adaptive filter. An upsampling detection module 102, an implementation of which is described in more detail below in connection with FIGS. 3–5, processes an image 100 to detect whether at least a portion of the image was previously upsampled. For example, the upsampling detection module may output a measure of likelihood that the portion of the image was previously upsampled. The output of the upsampling detection module 102 is the detection result 104. The detection result 104 is applied to a control input of a selector 106 that receives the image data 100 at an input 108. The control input to the selector 106 configures the selector so as to control whether the image data 100 passes to output 110 or to output 112. If passed to output 112, the image data is filtered by filter 114, examples of which are described below. The unfiltered image data is passed to input 116 of a selector 120 whereas the filtered image data is passed to input 118 of the selector 120. Selector 120 also is controlled by the detection result 104. The image data output by the selector 120 is decimated by decimator 122. Although selectors 106 and 120 are shown as two selectors in FIG. 1, such selectors may be one selector, particularly if implemented as part of a computer program. The selectors 106 and 120 thus controls flow of image data according to the received information such that the portion of the image is decimated without filtering the portion of the image if the portion of the image in the first color representation was filtered using the upsampling filter, and the portion of the image is filtered before decimating the portion of the image if the portion of the image in the first color representation was not filtered using the upsampling filter.

Figure 2:
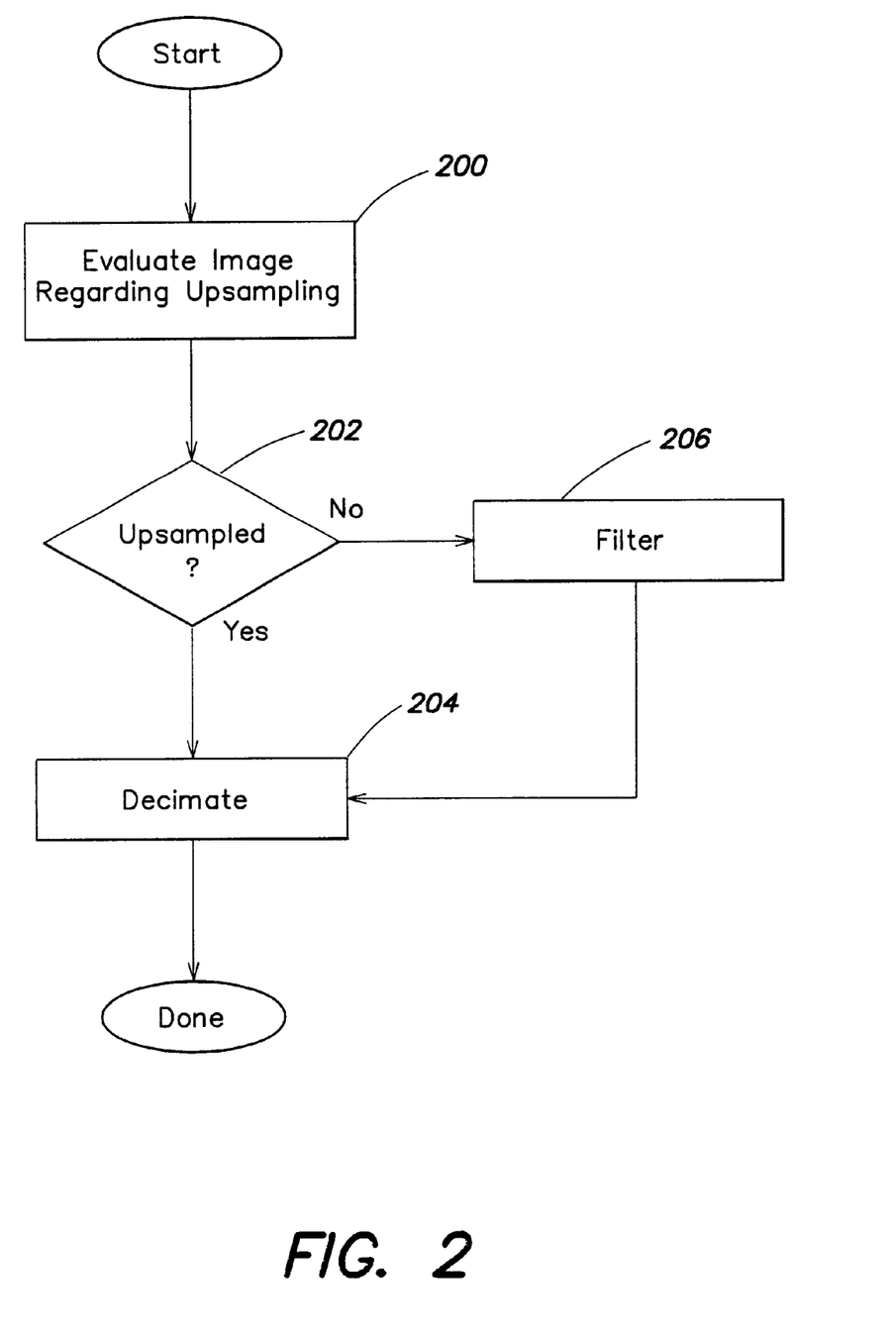
FIG. 2 is a flow chart describing operation of a generation adaptive filter.

FIG. 2 is a flow chart describing operation of a generation adaptive filter. The image is evaluated 200 to detect whether any portion of the image had been previously upsampled, in a manner described below. If the image was previously upsampled, determined in step 202, the image is decimated 204. If the image was not previously upsampled, the image is filtered 206, in a manner described below, then decimated 204.

FIGS. 3A–3D are graphs illustrating how a portion of an image may be analyzed to detect whether the portion had been previously filtered. The operation of an example implementation of upsampling detection module 102 (FIG. 1) that may use this technique is described below in connection with FIGS. 4–5. In particular, this process is based on a principle that if a set of samples of image data is upsampled to create a set of samples of interpolated image data, the interpolated samples have values that are known for a given interpolation filter. A set of samples may be selected from the input image data that would have been used to create an interpolated sample by a given interpolation filter if the input image data was previously upsampled.

Figure 3A:
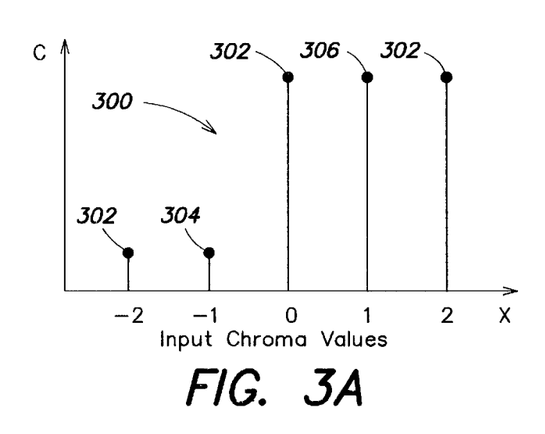
FIGS. 3A–3D are graphs illustrating how a portion of an image may be analyzed to detect whether the portion had been previously filtered.
Figure 3B:
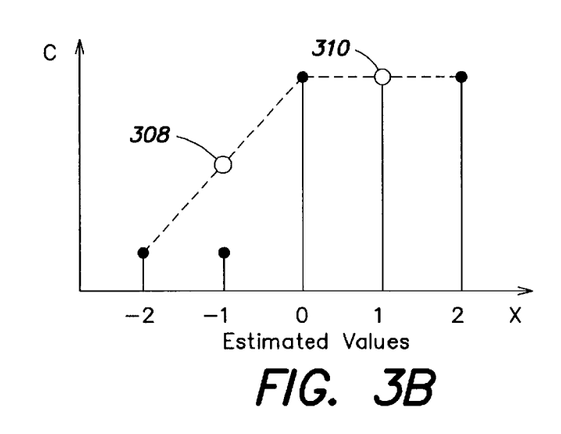
Figure 3C:
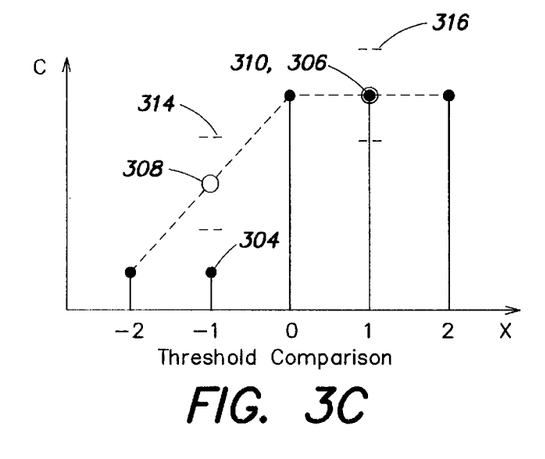
Figure 3D:
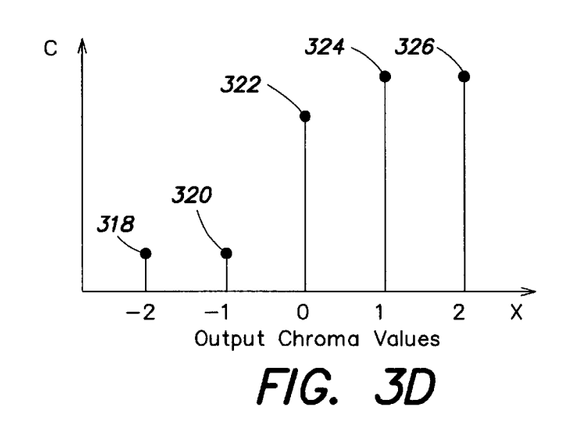

In FIG. 3A, a set of samples 300 of one component of several pixels of an image is shown having magnitude C along the vertical axis and time X along the horizontal axis. The samples shown in FIG. 3A have not yet been subsampled. If these samples were obtained by upsampling, then samples 302 were used by an interpolation filter to obtain samples 304 and 306. (In this example, the use of a linear interpolation filter is assumed). The set of samples 302 are applied to the interpolation filter to obtain estimated upsampled data 308 and 310, as shown in FIG. 3B. If one of these interpolated values 308 and 310 is outside a threshold 314, 316 (both above and below) of the actual corresponding values 304 and 306 in the original set of samples 300, as shown in FIG. 3C, the portion of the input image data around the pixel at time=0 in the graph likely was not previously subsampled and upsampled. The chrominance values in this portion of the image then are filtered, an example result of which is shown in FIG. 3D. In FIG. 3D, the output samples 318, 320, 324 and 326 are essentially unchanged from the input samples, but output sample 322 has been changed from the corresponding input sample. The filtered output samples are then subsampled to provide the subsampled image data.

The example in FIGS. 3A–3D illustrates one estimated value being compared to one actual value. In YCrCb 4:2:2 data, the distance, such as the Euclidean distance or squared Euclidean distance, between the estimated values for the two chrominance components and the actual values for the two chrominance components at a particular sample time may be computed and compared to a threshold.

Figure 4:
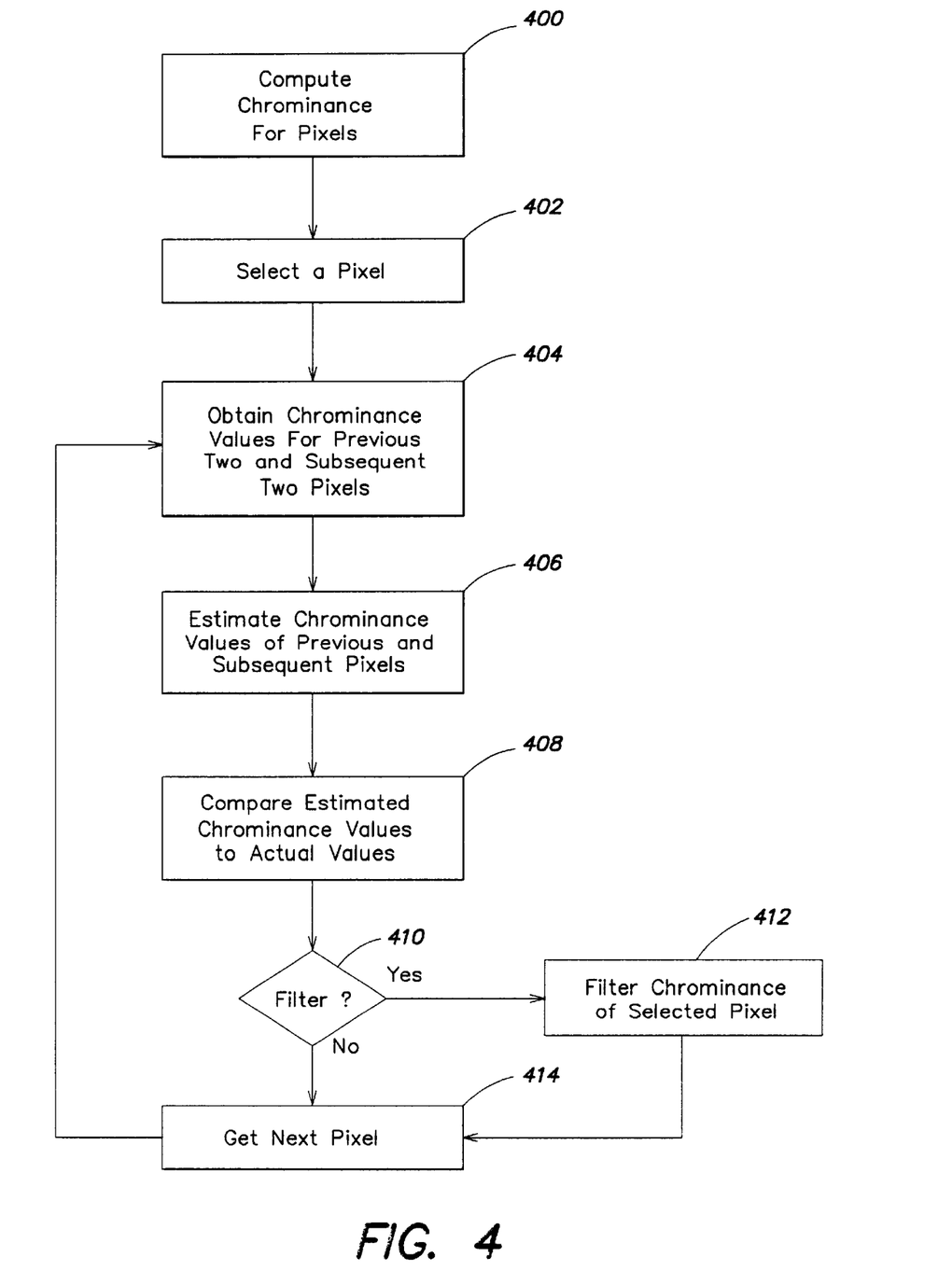
FIG. 4 is a flow chart describing operation of an example implementation of an upsampling detection module.

FIG. 4 is a flowchart describing in more detail an example implementation of such an upsampling detection module. This process evaluates the input image pixel by pixel. First, the values for the chrominance components of each pixel in an image (received in, for example, an RGB format) are computed 400. A pixel is then selected 402 and the values of its chrominance components are obtained. The first two and last two pixels of the image can be omitted. The values of the chrominance components of the previous two and subsequent two pixels are then obtained 404. The values of chrominance components of the previous and subsequent pixels then are estimated 406. The estimated values are compared 408 to the actual values. According to the comparison, if the image portion is to be filtered, as determined at 410, the chrominance values of pixels in the image around the selected pixel are filtered 412. After filtering, the filtered output image data may be provided as a filtered image in YUV component values or in RGB component values, or any other component values. Otherwise, or after filtering, the next pixel, if any, is selected 414 and processing continues with step 404. When the process of FIG. 4 completes filtering the image, the chrominance components of pixels the resulting image data may be decimated.

Figure 5:
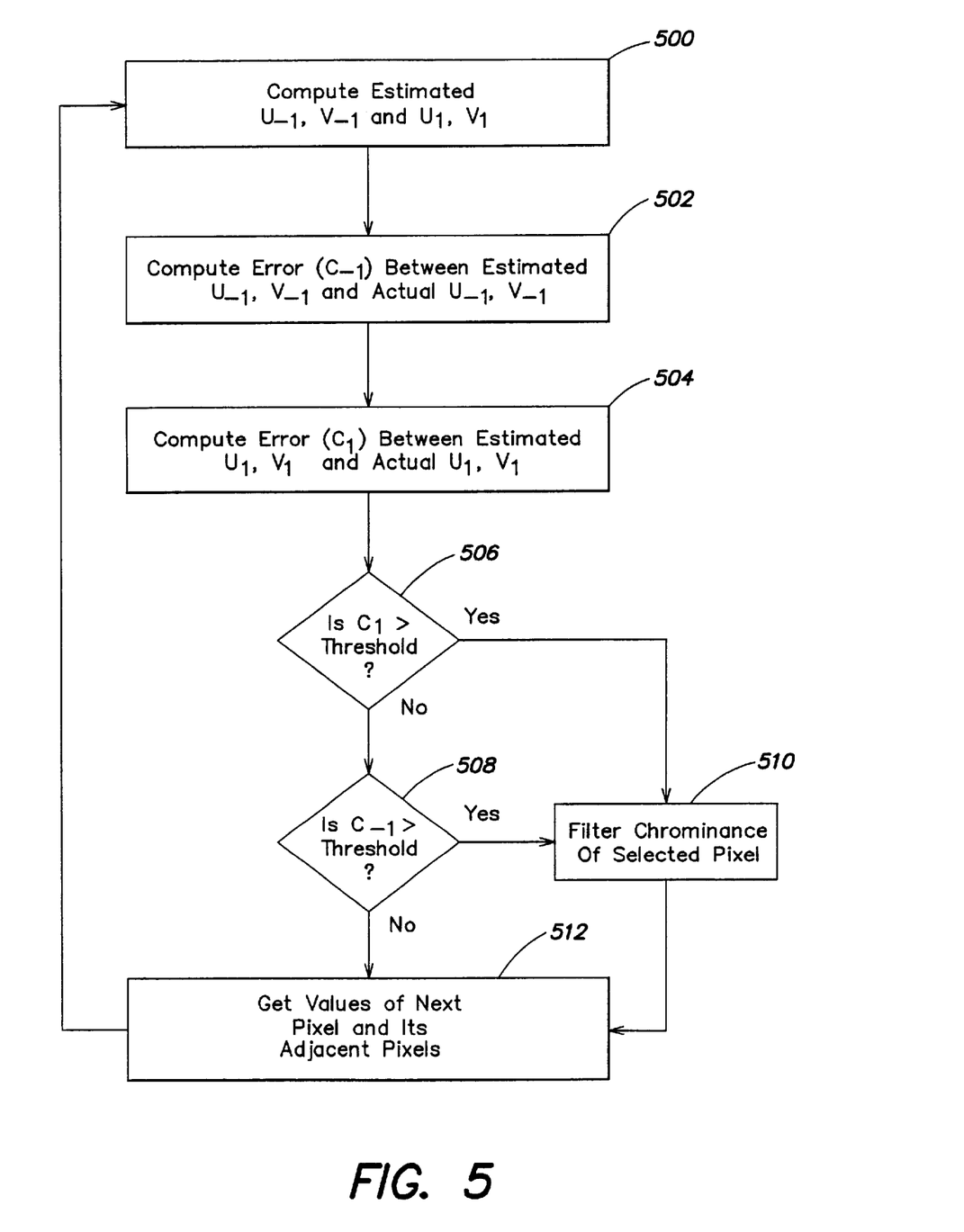
FIG. 5 is a flow chart describing more details of operations in FIG. 4.

More details of the process shown in FIG. 4 will now be described in connection with FIG. 5. In particular, for a selected pixel (having chrominance values $u_0$, $v_0$), estimated chrominance values for the immediately preceding and subsequent pixels are computed 500 using its neighboring pixels at sampling times $-2$ and $+2$, according to the interpolation filter being used for upsampling. For example, linear interpolation (an arithmetic mean) between $u_{-2}$, $v_{-2}$ and $u_0$, $v_0$ can be used to compute the estimated values $u_{-1}$, $v_{-1}$, and between $u_0$, $v_0$ and $u_2$, $v_2$ can be used to compute the estimated values $u_1$, $v_1$. The error $c_{-1}$ between the estimated values for $u_{-1}$, $v_{-1}$ and the actual values are computed 502, for example using a Euclidean distance or squared Euclidean distance. The error $c_1$ between the estimated values for $u_1$, $v_1$ and the actual values are computed 504, for example using a Euclidean distance or squared Euclidean distance. If either $c_1$ or $c_{-1}$ is greater than a specified threshold, as determined in 506 or 508, then the chrominance values of the selected pixel are filtered 510 before the values of the next pixel and its adjacent pixels are obtained 512. For example, a 1:2:1 tent filter may be used to compute the filtered values $u_{f0}$, $v_{f0}$ from $u_{-1}$, $v_{-1}$, $u_0$, $v_0$ and $u_1$, $v_1$, by:

$$u_{f0}=(u_{-1}+2*u_0+u_1)/4$$

$$v_{f0}=(v_{-1}+2*v_0+v_1)/4$$

The comparison in step 408, and the error computation in steps 502 and 504 may be performed by computing the distance between the pairs of chrominance values, for example by using a distance metric such as a Euclidean distance or squared Euclidean distance. The distance is then compared to a threshold. The actual threshold selected involves a trade off. If the threshold is tight, more filtering of the input image likely is to occur, but better image quality may be obtained. However, if the threshold is more forgiving, less filtering of the input image likely is to occur, but some generational loss of image quality may result. The comparison to the threshold may be performed, for example, by comparing the calculated distance to the threshold by using a "less than" or a "less than or equal to" comparison operation.

Clipping also may occur on image data in the RGB color space. In particular, if data is upsampled, filtering occurs only on the chroma samples of the YCrCb values prior to conversion to RGB values, whereas the luma stays the same. However, the luma may be changed if the resulting RGB values are outside of the range of legal RGB values (16–235) in the ITU 601 standard. If the values are clipped, upsampling detection may not work if a tight threshold is used. A threshold of +/−20 (an integer value in RGB space) for 8-bit samples for comparison to a Euclidean distance metric (or 400 for a squared Euclidean distance metric) appears to work well.

A result of upsampling detection that can be retained is information, for each pixel of an image, of the likelihood that the portion of the image around the pixel was previously upsampled. A matrix of values may be used to represent all of these values for an image. This data could be stored as metadata along with an image to be used for other kinds of processing. This information may be used, for example, to indicate whether the image, or a portion of it, was previously in the system.

Many kinds of filters may be used to implement filter 114 in FIG. 1 or to perform the filtering step 206 in FIG. 2. The filter may be, for example, a half-band FIR filter. Characteristics of a good filter for chroma down-sampling would reduce aliasing by attenuating the frequencies above the half band, and would keep the weights positive to avoid undershoots and overshoots, and would use a relatively small number of taps, e.g., less than seven, to reduce computation time in the upsampling detection module and the filter. Only the chroma values are filtered, not the luminance values. A 3-tap tent filter (with 1:2:1 as values) and a 5-tap Gaussian filter (with 2:15:30:15:2 as values) are examples of suitable implementations of the filter. Larger filter kernels show marginally better results but significantly lower performance. The use of a narrow tent filter reduces the extent to which the image is softened, but provides sufficient filtering to avoid introduction of artifacts in an image that may occur after multiple filtering and upsampling operations.

It also is possible to have a thresholding operation that acts as a soft threshold instead of a hard threshold. It such an implementation, two thresholds may be used. If the difference between the estimated value and the actual value is less than a first threshold, filtering is not performed. If the difference (D) between the estimated value and the actual value is greater than the first threshold (FT) but less than a second threshold (ST), an operation may be performed to combine both a filtered image and the unfiltered image. For example, a blend of these two images may be performed according to the following function:

New value=$A$(filtered pixel value)+$(1-A)$(unfiltered pixel value), where A is an alpha value equal to $(D-FT)/(ST-FT)$. If the difference between the estimated value and the actual value is greater than the second threshold, filtering is performed.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for importing an image in a first color representation into digital nonlinear video editing system that uses images in a second subsampled color representation, comprising:

detecting in a portion of the image in the first color representation a signature of an upsampling filter for generating an image in the first color representation from an image in the second subsampled color representation;

if the signature is detected, decimating the portion of the image in the first color representation without filtering the portion of the image; and if the signature is not detected, filtering the portion of the image in the first color representation before decimating the portion of the image, wherein detecting comprises determining a measure of likelihood that an image in a first color representation was filtered using an upsampling filter used by a digital nonlinear video editing system to generate an image in the first color representation from an image in a second subsampled color representation, and wherein determining the measure of likelihood comprises:

selecting a set of pixels in the image in the first color representation according to the second subsampled color representation;

estimating a value for each of a plurality of pixels intermediate the selected pixels; and comparing the estimated value to an actual value for the plurality of pixels intermediate the selected pixels in the image in the first color representation.

2. The method of claim 1, wherein filtering comprises applying a tent filter to pixel data comprising the portion of the image.

3. The method of claim 1, wherein comparing comprises:

determining whether the estimated value is within a range defined around the actual value.

4. A method for importing an image in a first color representation into digital nonlinear video editing system that uses images in a second subsampled color representation, comprising:

detecting in a portion of the image in the first color representation a signature of an upsampling filter for generating an image in the first color representation from an image in the second subsampled color representation;

if the signature is detected, decimating the portion of the image in the first color representation without filtering the portion of the image; and if the signature is not detected, filtering the portion of the image in the first color representation before decimating the portion of the image, wherein detecting comprises:

selecting a set of pixels in the image in the first color representation according to the second subsampled color representation;

estimating a value for each of a plurality of pixels intermediate the selected pixels; and comparing the estimated value to an actual value for the plurality of pixels intermediate the selected pixels in the image in the first color representation.

5. The method of claim 4, wherein comparing comprises: determining whether the estimated value is within a range defined around the actual value.

6. The method of claim 4, wherein filtering comprises applying a tent filter to pixel data comprising the portion of the image.

7. A system for importing an image in a first color representation into digital nonlinear video editing system that uses images in a second subsampled color representation, comprising:

means for detecting in a portion of the image in the first color representation a signature of an upsampling filter for generating an image in the first color representation from an image in the second subsampled color representation;

means for decimating the portion of the image in the first color representation without filtering the portion of the image if the signature is detected; and means for filtering the portion of the image in the first color representation before decimating the portion of the image if the signature is not detected, wherein the means for detecting comprises:

means for selecting a set of pixels in the image in the first color representation according to the second subsampled color representation;

means for estimating a value for each of a plurality of pixels intermediate the selected pixels; and means for comparing the estimated value to an actual value for the plurality of pixels intermediate the selected pixels in the image in the first color representation.

8. The system of claim 7, wherein the means for comparing comprises means for determining whether the estimated value is within a range defined around the actual value.

9. The system of claim 7, wherein means for filtering comprises means for applying a tent filter to pixel data comprising the portion of the image.

10. A system for importing an image in a first color representation into digital nonlinear video editing system that uses images in a second subsampled color representation, comprising:

an upsampling detection module having an input for receiving a portion of the image in the first color representation and an output for providing detection results indicative of whether a signature was detected of an upsampling filter used for generating an image in the first color representation from an image in the second subsampled color representation;

a filter having an input for receiving a portion of the image and an output for providing filtered image data;

a decimator having an input for receiving image data and an output for providing subsampled image data; and one or more selectors having an input for receiving the detection results and controlling flow of image data such that the portion of the image in the first color representation is decimated by the decimator without filtering the portion of the image if the signature is detected, and the portion of the image in the first color representation is filtered before decimating the portion of the image if the signature is not detected, wherein the upsampling detection module comprises:

means for selecting a set of pixels in the image in the first color representation according to the second subsampled color representation;

means for estimating a value for each of a plurality of pixels intermediate the selected pixels; and means for comparing the estimated value to an actual value for the plurality of pixels intermediate the selected pixels in the image in the first color representation.

11. The system of claim 10, wherein the means for comparing comprises means for determining whether the estimated value is within a range defined around the actual value.

12. The system of claim 10, wherein the filter comprises a tent filter.

13. A method for importing an image in a first color representation into digital nonlinear video editing system that uses images in a second subsampled color representation, comprising:

for each pixel in an image in the second color representation, determining whether a corresponding portion of the image in the first color representation was filtered using an upsampling filter for generating an image in the first color representation from an image in the second subsampled color representation;

if the portion of the image in the first color representation was filtered using the upsampling filter, decimating the portion of the image without filtering the portion of the image; and if the portion of the image in the first color representation was not filtered using the upsampling filter, filtering the portion of the image before decimating the portion of the image, wherein determining whether the corresponding portion of the image in the first color representation was filtered using the upsampling filter comprises:

selecting a set of pixels in the image in the first color representation according to the second subsampled color representation;

estimating a value for each of a plurality of pixels intermediate the selected pixels; and comparing the estimated value to an actual value for the plurality of pixels intermediate the selected pixels in the image in the first color representation.

14. The method of claim 13, wherein filtering comprises applying a tent filter to pixel data comprising the portion of the image.

15. The method of claim 13, wherein comparing comprises: determining whether the estimated value is within a range defined around the actual value.

16. A method for importing an image in a first color representation into digital nonlinear video editing system that uses images in a second subsampled color representation, comprising:

for each pixel in an image in the second color representation, determining whether a corresponding portion of the image in the first color representation was filtered using an upsampling filter for generating an image in the first color representation from an image in the second subsampled color representation;

if the portion of the image in the first color representation was filtered using the upsampling filter, decimating the portion of the image without filtering the portion of the image; and if the portion of the image in the first color representation was not filtered using the upsampling filter, filtering the portion of the image before decimating the portion of the image, wherein determining comprises determining a measure of likelihood that an image in a first color representation was filtered using an upsampling filter used by a digital nonlinear video editing system to generate an image in the first color representation from an image in a second subsampled color representation, wherein determining the measure of likelihood comprises:

selecting a set of pixels in the image in the first color representation according to the second subsampled color representation;

estimating a value for each of a plurality of pixels intermediate the selected pixels; and comparing the estimated value to an actual value for the plurality of pixels intermediate the selected pixels in the image in the first color representation.

17. The method of claim 16, wherein comparing comprises:

determining whether the estimated value is within a range defined around the actual value.

18. The method of claim 16, wherein filtering comprises applying a tent filter to pixel data comprising the portion of the image.

19. A system for importing an image in a first color representation into digital nonlinear video editing system that uses images in a second subsampled color representation, comprising:

means for determining, for each pixel in an image in the second color representation, whether a corresponding portion of the image in the first color representation was filtered using an upsampling filter for generating an image in the first color representation from an image in the second subsampled color representation;

means for decimating the portion of the image without filtering the portion of the image if the portion of the image in the first color representation was filtered using the upsampling filter; and means for filtering the portion of the image before decimating the portion of the image if the portion of the image in the first color representation was not filtered using the upsampling filter;

wherein the means for determining comprises:

means for selecting a set of pixels in the image in the first color representation according to the second subsampled color representation;

means for estimating a value for each of a plurality of pixels intermediate the selected pixels; and means for comparing the estimated value to an actual value for the plurality of pixels intermediate the selected pixels in the image in the first color representation.

20. The system of claim 19, wherein the means for comparing comprises means for determining whether the estimated value is within a range defined around the actual value.

21. The system of claim 19, wherein the means for filtering comprises a tent filter.

22. A system for importing an image in a first color representation into digital nonlinear video editing system that uses images in a second subsampled color representation, comprising:

an upsampling detector having an input for receiving at least a portion of the image, and having an output for providing and indication, for each pixel in an image in the second color representation, whether a corresponding portion of the image in the first color representation was filtered using an upsampling filter used for generating an image in the first color representation from an image in the second subsampled color representation;

a filter having an input for receiving a portion of the image and an output for providing filtered image data;

a decimator having an input for receiving image data and an output for providing subsampled image data; and one or more selectors having an input for receiving the detection results and controlling flow of image data such that the portion of the image is decimated without filtering the portion of the image if the portion of the image in the first color representation was filtered using the upsampling filter, and the portion of the image is filtered before decimating the portion of the image if the portion of the image in the first color representation was not filtered using the upsampling filter, wherein the upsampling detector comprises:

means for selecting a set of pixels in the image in the first color representation according to the second subsampled color representation;

means for estimating a value for each of a plurality of pixels intermediate the selected pixels; and means for comparing the estimated value to an actual value for the plurality of pixels intermediate the selected pixels in the image in the first color representation.

23. The system of claim 22, wherein the means for comparing comprises means for determining whether the estimated value is within a range defined around the actual value.

24. The system of claim 22, wherein the filter comprises a tent filter.

25. A method for determining a measure of likelihood that an image in a first color representation was filtered using an upsampling filter used by a digital nonlinear video editing system to generate an image in the first color representation from an image in a second subsampled color representation, comprising:

selecting a set of pixels in the image in the first color representation according to the second subsampled color representation;

estimating a value for each of a plurality of pixels intermediate the selected pixels; and comparing the estimated value to an actual value for the plurality of pixels intermediate the selected pixels in the image in the first color representation.

26. The method of claim 25, wherein comparing comprises:

determining whether the estimated value is within a range defined around the actual value.

27. A system for determining a measure of likelihood that an image in a first color representation was filtered using an upsampling filter used by a digital nonlinear video editing system to generate an image in the first color representation from an image in a second subsampled color representation, comprising:

means for selecting a set of pixels in the image in the first color representation according to the second subsampled color representation;

means for estimating a value for each of a plurality of pixels intermediate the selected pixels; and means for comparing the estimated value to an actual value for the plurality of pixels intermediate the selected pixels in the image in the first color representation.

28. The system of claim 27, wherein means for comparing comprises means for determining whether the estimated value is within a range defined around the actual value.

* * * * *